(12) United States Patent
Zimmermann et al.

(10) Patent No.: US 7,387,574 B2
(45) Date of Patent: Jun. 17, 2008

(54) SERIES OF ADAPTER DEVICES AND ADAPTER DEVICE

(75) Inventors: Heinrich Zimmermann, Bruchsal (DE); Roland Denefleh, Einhausen (DE); Günter Oberländer, Kraichtal (DE)

(73) Assignee: Sew-Eurodrive GmbH & Co., Bruchsal (DE)

( * ) Notice: Subject to any disclaimer, the term of this patent is extended or adjusted under 35 U.S.C. 154(b) by 202 days.

(21) Appl. No.: 10/344,437

(22) PCT Filed: Aug. 30, 2001

(86) PCT No.: PCT/EP01/10008

§ 371 (c)(1),
(2), (4) Date: Feb. 10, 2003

(87) PCT Pub. No.: WO02/21895

PCT Pub. Date: Mar. 21, 2002

(65) Prior Publication Data

US 2003/0176222 A1    Sep. 18, 2003

(30) Foreign Application Priority Data

Sep. 13, 2000    (DE) ............................... 100 45 501

(51) Int. Cl.
*F16D 3/78* (2006.01)
(52) U.S. Cl. .......................................... 464/73; 464/87
(58) Field of Classification Search ................. 464/73, 464/30, 35, 36, 46, 137, 157, 87
See application file for complete search history.

(56) References Cited

U.S. PATENT DOCUMENTS

| | | | | |
|---|---|---|---|---|
| 3,118,261 A | * | 1/1964 | Glaude | 451/415 |
| 3,363,435 A | * | 1/1968 | Crow | 464/73 |
| 3,396,556 A | * | 8/1968 | Giegerich | 464/73 |
| 3,638,454 A | * | 2/1972 | Croset | 464/76 |
| 3,837,179 A | * | 9/1974 | Barth | 464/76 |
| 4,540,382 A | * | 9/1985 | Wilson | 464/73 |
| 4,655,729 A | * | 4/1987 | Kottke | 464/38 |
| 4,678,452 A | | 7/1987 | Nelson et al. | |
| 4,925,408 A | * | 5/1990 | Webb et al. | 440/38 |

FOREIGN PATENT DOCUMENTS

| | | |
|---|---|---|
| DE | 88 05 824 | 7/1988 |
| DE | 196 37 361 | 3/1998 |
| DE | 199 57 062 | 5/2001 |

* cited by examiner

*Primary Examiner*—Kenneth Thompson
(74) *Attorney, Agent, or Firm*—Kenyon & Kenyon LLP (57) ABSTRACT

An adapter device and a production series of adapter devices for connecting an input shaft, e.g., a motor shaft of a motor, e.g., an electric motor, to a device to be driven, e.g., to a pinion of a gear unit, including an adapter shaft for the rotatably-fixed connection to the device to be driven, an intermediate piece engaged with the adapter shaft, and a sub-component that is engaged with the intermediate piece and is detachably connectable with form-locking to an input shaft, particularly a motor shaft. The sub-component includes a bore hole for accommodating the input shaft in the sub-component, and the sub-component has at least three claws for forming the coupling. The adapter shaft, at its second end, thus at the end facing the intermediate piece, has at least three claws for forming a coupling. The intermediate piece is provided between the claws of the sub-component and the claws of the adapter shaft.

12 Claims, 7 Drawing Sheets

| P | 0,25 | 0,37 | 0,75 | 1,5 | 3 | 4 | 7,5 | 9,2 | 15 | 22 | 30 | 45 |
|---|---|---|---|---|---|---|---|---|---|---|---|---|
| $A\_i$ | $A_1=11$ | $A_2=14$ | $A_3=19$ | $A_4=24$ | $A_5=28$ | $A_5=28$ | $A_6=38$ | $A_6=38$ | $A_7=42$ | $A_8=48$ | $A_9=55$ | $A_{10}=60$ |
| $D_1$ | K1 | K1 | | | | | | | | | | |
| $D_2$ | | | K2 | K2 | | | | | | | | |
| $D_3$ | | | K2 | K2 | | | | | | | | |
| $D_4$ | | | | | K3 | | | | | | | |
| $D_5$ | | | | | | K3 | | | | | | |
| $D_6$ | | | | | | | K4 | | | | | |
| $D_7$ | | | | | | | | K4 | K5 | K5 | | |
| $D_8$ | | | | | | | | | K5 | K5 | | |
| $D_9$ | | | | | | | | | | | K6 | K6 |

Fig. 3

| P | 0,37 | 0,75 | 1,5 | 2,2 | 3,7 | 5,6 | 7,5 | 11 | 15 | 18,5 | 22 | 30 | 37 | 45 | 56 |
|---|---|---|---|---|---|---|---|---|---|---|---|---|---|---|---|
| $A\_i$ | $A_1=$ 15,875 | $A_2=$ 22,225 | $A_2=$ 22,225 | $A_3=$ 28,575 | $A_3=$ 28,575 | $A_4=$ 34,925 | $A_4=$ 34,925 | $A_5=$ 41,275 | $A_5=$ 41,275 | $A_6=$ 47,625 | $A_6=$ 47,625 | $A_7=$ 53,975 | $A_7=$ 53,975 | $A_8=$ 60,325 | $A_8=$ 60,325 |
| $D_1$ | K1 | | | | | | | | | | | | | | |
| $D_2$ | | K2 | K2 | | | | | | | | | | | | |
| $D_3$ | | K2 | K2 | | | | | | | | | | | | |
| $D_4$ | | | | K3 | | | | | | | | | | | |
| $D_5$ | | | | | K3 | | | | | | | | | | |
| $D_6$ | | | | | | K4 | | | | | | | | | |
| $D_7$ | | | | | | K4 | K4 | K5 | K5 | K5 | K5 | | | | |
| $D_8$ | | | | | | | | K5 | K5 | K5 | K5 | K6 | K5 | K6 | |
| $D_9$ | | | | | | | | | | | | | | | K6 |

SERIES OF ADAPTER DEVICES AND ADAPTER DEVICE

FIELD OF THE INVENTION

The present invention relates to a production series of adapter devices and an adapter device.

BACKGROUND INFORMATION

German Published Patent Application No. 196 37 361 describes an adapter which is able to transmit a certain torque. However, for industrial applications, it is necessary to construct drives having ever higher torque, accompanied by the most cost-effective design possible.

Therefore, an object of the present invention is to provide an adapter device while avoiding the aforesaid disadvantages. In particular, a higher torque may be transmittable, accompanied at the same time by an inexpensive design.

SUMMARY

According to the present invention, the objective is achieved by providing a production series as described herein and by providing an adapter device as described herein.

Essential features of the invention in the case of the adapter device for connecting an input shaft, particularly a motor shaft of a motor, especially an electric motor, to a device to be driven, particularly to a pinion of a gear unit, including an adapter shaft for the rotatably-fixed connection to the device to be driven, an intermediate piece engaged with the adapter shaft, and a sub-component that is engaged with the intermediate piece and is detachably connectable with form locking to an input shaft, particularly a motor shaft, the sub-component including a bore hole for accommodating the input shaft in the sub-component, and the sub-component having at least three claws for forming the coupling, at its second end, thus the end facing the intermediate piece, the adapter shaft having at least three claws for forming a coupling, and the intermediate piece being provided between the claws of the sub-component and the claws of the adapter shaft.

The adapter shaft may include claws on itself. Therefore, the adapter shaft is usable simultaneously for the rotatably-fixed connection to a pinion of a device to be driven, and at its other end is usable as part of a claw coupling which is formed by the claws of the adapter shaft itself, the intermediate piece and the claws of the sub-component. Since the claws are able to be manufactured by processing the master pattern of the adapter shaft, the spatial orientation, particularly the distance to the axis, as well as all further specific geometric characteristics relative to the axis of the adapter shaft may be so well produced, that the need for adjusting the claws relative to the axis of the adapter shaft may be eliminated, and therefore it may be acceptable to produce the claws with the adapter shaft from one piece. It has turned out that the tolerances are adhered to so well, that there may even be improvements in the service life and further characteristic data compared to an adapter shaft having a separate claw coupling.

Since the sub-component includes a bore hole for accommodating the input shaft in the sub-component, motor shafts of various lengths are connectable to it depending on the different design or standard.

The intermediate piece may be provided between the claws of the adapter shaft and of the sub-component, and therefore, in the event the intermediate piece fails, the claws form a coupling directly, a correspondingly large play developing. Thus, reliability may be extremely high, even in the case of breakdown. In particular, because of the large play, in response to the failure described, a noise develops during operation which is clearly transmittable to the operator as a warning indication.

By integrating the claws into the adapter shaft and the sub-component, many components may be omitted. With the aid of the intermediate piece, on the sub-component side there may be created an interface which makes it possible to connect various sub-components. These sub-components may only have the same claws. For that reason, various sub-components are useable for the production series. Therefore, the diversity of functionalities which may be offered increases considerably, while at the same time production expenditure may be reduced. For example, it is possible to fulfill the request of the customer to provide only the functionality of a claw coupling between the motor and gear unit, or alternatively, to provide the functionality of an overload coupling in addition to the functionality of a claw coupling.

In this context, the claw coupling may compensate for geometrical deviations. The overload coupling may exhibit a desired behavior in response to overloading. Therefore, both features may be combined in the present invention, the need for parts or components simultaneously being eliminated. In particular, the connection to the sub-component may be implemented especially simply and quickly and at the same time without further parts which would be used to compensate for the geometric position between a claw coupling and an overload coupling in the case of the related art.

The intermediate piece may be selected to be more flexible, and thus exhibit a torsional stiffness characteristic or transmission function corresponding to a greater elasticity. In addition, the claws are isolated from each other by the radial sections of the intermediate piece. Thus, the coupling attenuates torque fluctuations to be transmitted. As already indicated above, the coupling produced by the adapter device is fail-safe. Namely, if the intermediate piece wears out or is stressed in response to too high a thermal load so that it is worn away, the claws ultimately meet. Thus, the basic function of the adapter device is retained. In such an emergency or accident, the metallic claws, by striking each other, particularly in response to torque fluctuations, then may generate a noise which makes the operator or a monitoring device aware of the wear and tear and therefore the emergency.

Due to the intermediate piece, the motor shaft may be allowed to extend into the adapter shaft, and therefore the entire adapter device may be implemented in a very compact fashion. In addition, the adapter shaft has claws. Consequently, a coupling function may be integrated into a shaft, thus the adapter shaft. A particularly compact design is thereby achieved which has fewer junctions and/or connections and makes the use of a separate coupling unnecessary. This may be an advantage when the present invention is used within a production series of gear units and motors. Therefore, the adapter device may be optimized for the power to be transmitted and for the frame sizes and bore-hole dimensions and/or shaft dimensions used in the production series of gear units and motors.

Since the adapter shaft and the coupling part with their respective claws are able to be implemented in metal and the number of claws is three or more, large torques are able to be transmitted. In particular, the number of claws may be optimized so that to the greatest extent possible, all material parts transmit as much force and/or torque as possible. Moreover, there are no substantial material areas which are unused.

With respect to the intermediate piece, in one example embodiment, radial sections are arranged in the radial direction starting in each case from the base member. The base member of the intermediate piece has a bore hole, and the diameter of this bore hole is greater than the diameter of the input shaft, particularly the motor shaft. The radial sections of the intermediate piece are disposed between the claws of the adapter shaft and the claws of the coupling part, and are convex in the radial direction. Each of the radial sections has such a thickness profile in the radial direction, and the claws or their flanks are curved and/or formed radially so that in the circumferential direction that under nominal load, the radial sections subject the base member of the intermediate piece to pressure in the radial direction. The radial sections have spacers in the axial direction to the adapter shaft and to the coupling part. The radial sections are each arranged in the radial direction starting from the base member. Due to the special formation of the radial sections and due to the formation of the claws, under load, the material of the radial sections is pushed in the direction of the base member, so that a pressure is able to be exerted on it in the radial direction. Therefore, no material may be squeezed to the outside, which may cause the intermediate piece to wear more quickly.

The torsional stiffness characteristic or transmission function of the adapter device is variable by the specially selectable design of the radial sections.

The integration of the spacers for maintaining axial distances into the intermediate piece may be extremely cost-effective, and may result in an even more compact construction.

In particular, the star-shaped configuration of the intermediate piece and the compact construction described interact so that all in all, an extremely compact coupling function is produced accompanied by extremely high transferable torque. The adapter shaft with its claws is manufactured from one piece, and the sub-component with its claws is manufactured from one piece, or the sub-component includes a driver part which has the claws and is produced with these claws from one piece.

In one example embodiment, after the intermediate piece has failed, particularly due to chemically or mechanically caused breakdown, the claws of the sub-component and the claws of the adapter shaft form a play-encumbered, form-locking connection. Thus, the adapter device exhibits increased reliability.

In one example embodiment, the sub-component is able to be variably designed for forming different variants of a production series. For the form-locking connection to an input shaft, it is possible to provide either a coupling part which is engaged with the intermediate piece and is detachably connectable with form locking to the input shaft, or an overload coupling which is engaged with the intermediate piece and is detachably connectable with form locking to the input shaft, particularly by a feather key connection as sub-component. In this context, it may be possible to offer functionalities which differ greatly depending on the application, accompanied by simultaneous ability to rationalize production, the lowering of storage costs and a very compact type of design.

In one example embodiment, at its end area facing away from the intermediate piece, the adapter shaft has a feather keyway for the connection to a pinion of a gear unit as the device to be driven.

In one example embodiment, the intermediate piece includes a base member and at least six radial sections arranged in the shape of a star. The radial sections may be able to be mounted together, and easily and quickly, because the base member connects them. In addition, the number of radial sections is at least six, an optimal value for compressive load per unit area thereby being attainable.

In one example embodiment, to accommodate the input shaft, the sub-component has a bore hole and is connectable to the input shaft by a feather key connection. This is a detachable connecting technique and thus permits quick and easy assembly, servicing or exchange of components.

In one example embodiment, the adapter shaft has a bore hole such that, and the diameter of this bore hole is greater than the diameter of the input shaft such that the end of the input shaft on the adapter shaft side is insertable into the adapter shaft and/or may be provided in a manner that it is able to extend into the adapter shaft without engaging with the adapter shaft. Therefore, different lengths of the motor shaft may be used depending on the standard.

Essential features of the present invention with respect to the production series of adapter devices is that the production series includes at least one size and each size includes at least one variant;

and each adapter device including at least
an adapter shaft 1 for the connection to a device to be driven,
an intermediate piece 2 engaged with adapter shaft 1, and
a sub-component, engaged with intermediate piece 2, for connection to an input shaft, particularly a motor shaft;

and each variant being characterized at least by
a diameter A_i of a bore hole for accommodating the input shaft in the sub-component,
an intermediate piece 2, and
a diameter D_i at the end of adapter shaft 1 facing away from intermediate piece 2, being a numbering index;

and the diameters A_i of the bore holes for accommodating the input shaft in the sub-component being included by a standardized motor grading;

and in the case of the production series, with increasing characteristic power, the diameters D_i at least not become smaller;

and each intermediate piece 2 used in the production series having radial sections 6 which are designed such that, at the greatest power provided for the respective intermediate piece and/or characteristic power, they are in each case subjected to a value of compressive load per unit area being within a single tolerance range determined for the entire production series;

and at least one intermediate piece 2 being used in variants of at least two different sizes and/or at least one intermediate piece 2 being used for sub-components having a different diameter A_i of the bore hole for accommodating the input shaft, and for adapter shafts having different diameters D_i in the area of feather keyway 11 of adapter shaft 1.

In particular, for each variant, the characteristic power is the nominal power or the power to be transferred in each instance or the maximum transferable power. To achieve the objective of the present invention, a production series is formed having special features. These features may provide, inter alia, multiple usability within the production series, thus also reduction in storage costs, and the similar processing of parts, thus easier and faster production.

The material of the intermediate piece may be capable of being loaded up to its limit, and may be nevertheless usable repeatedly within the production series. Consequently, the adapter device is in each case able to be implemented with very small volume and the storage costs are kept low, and nevertheless a great variety of alternatives is made possible. In addition, an intermediate piece is used for coupling parts having in each case a different diameter A_i of the bore hole for accommodating the motor shaft and for adapter shafts having different diameters D_i in the area of the feather keyway of the adapter shaft. This means that not only the customary production series offered by the manufacturer, which has no filled 2*2 sub-matrices in its matrix, thus in the two-dimensional numerical schema formed from all tuples of two, but also additional special designs of the production series are included. This is expressed in table form in filled 2*2 sub-matrices.

Consequently, a new production series is used which is conventionally unknown but which may be special cost advantages and may be customer-friendly without extra cost.

The fact that toward the motor, the adapter devices have diameters of a standardized motor grading is customer-friendly and reduces the need for special designs for special diameters of the motor journal.

The compressive load per unit area may be determined in the middle of the cam lobes, and the number of radial sections that are loaded in each case is taken into account. In this context, an approximate value of the physical compressive load per unit area may be able to be calculated in a simple manner. The number of radial sections loaded in each case may be 3 or 4, the total number of radial sections being 6 or 8. Thus, the radial sections are not too thin, thus exhibit a high stability, and under load, at least 3 radial sections are always loaded.

In another example embodiment, the tolerance range includes values from 2 N/mm^2 to 3.2 N/mm^2. In this case, the material polyurethane may be usable for the intermediate piece.

The standardized motor series may include an IEC standardized motor grading or a NEMA standardized motor grading. Motor production series, customary in the market, according to international or U.S. American standard may be usable.

The production series may be included by a larger production series. Given very large or very small powers to be transmitted, it is also possible to use other adapter devices having, for example, different compressive loads per unit area, or the production series of the present invention is included in a production series which also has intermediate values for diameters D_i and A_i, and therefore offers a still larger selection to the customer.

The adapter device in the production series may include an adapter shaft which, at its first end, is connectable in a rotatably fixed manner to a pinion, and at its second end, has at least three claws for forming a coupling. The adapter shaft may be designed as one part, and thus it is possible to dispense with parts and the production series may be implemented in a particularly cost-effective manner.

REFERENCE NUMERAL LIST

1 adapter shaft
2 intermediate piece
3 coupling part
4 claws of the adapter shaft
5 base member
6 radial section
7 spacer
8 claws of the coupling part
9 feather keyway of the coupling part
10 motor shaft
11 feather keyway of the adapter shaft
12 feather keyway of the motor shaft
13 feather key
51 driver part
52 screws
53 other coupling part
58 claws
61 tapped hole
62 coupling hub
63 guide bush
64 brake disk
65 brake liners
66 slotted nut
67 disk spring
68 thrust ring
71 tapped hole
72 coupling hub
73 retaining ring
74 bearing
75 collar ring
76 ball
77 slotted nut
78 disk springs
79 thrust ring

DETAILED DESCRIPTION

Figure 1:
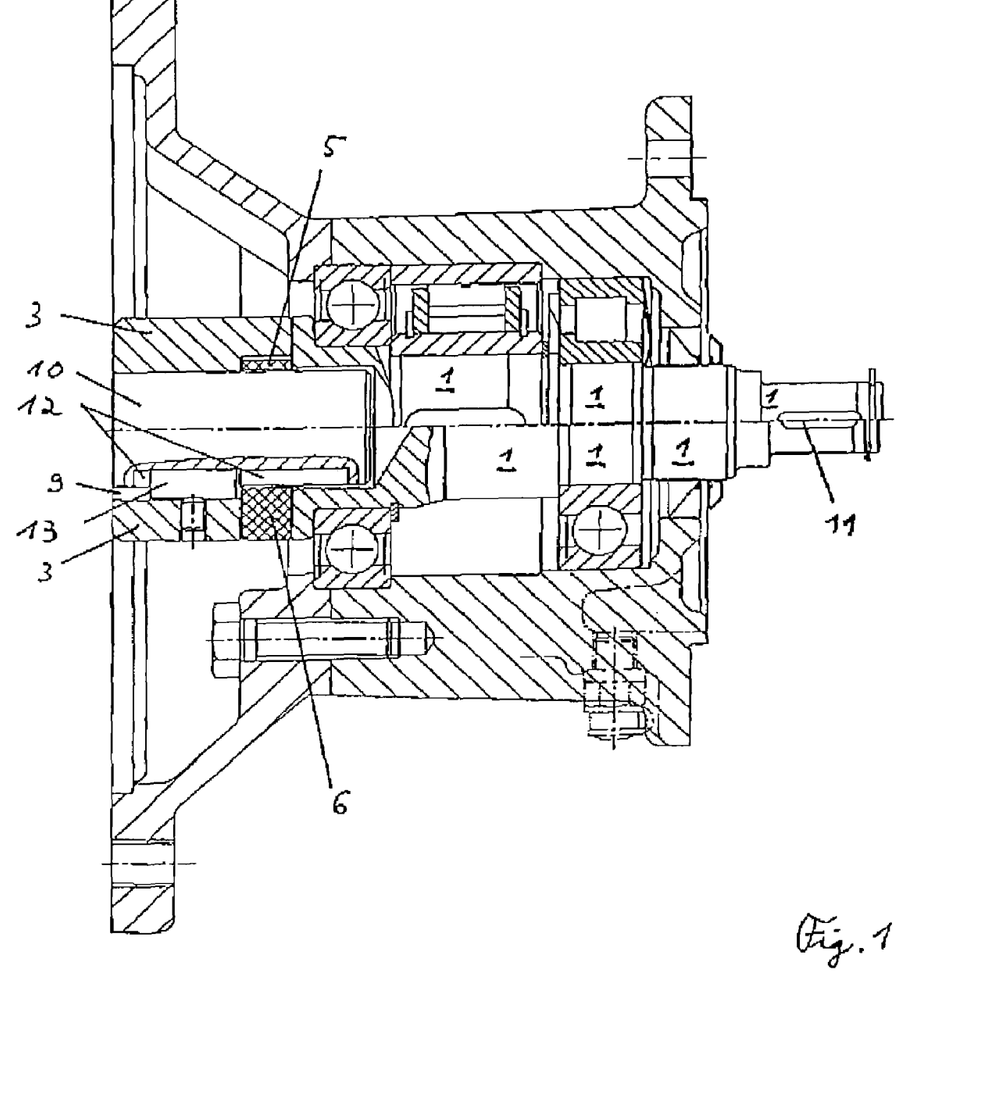
FIG. 1 shows a half section, which in the upper half shows a design having a reversal preventing device, and in the lower half shows a simple design.

Motor shaft 10 is mounted via a feather key 13 which is inserted in feather keyway 9 of coupling part 3 and in feather keyway 12 of the motor shaft, and represents a connection for transmitting torque. Intermediate piece 2 having base member 5 and radial sections 6 is positioned between coupling part 3 and adapter shaft 1.

Adapter shaft 1 has a feather keyway 11 for the connection to a pinion of a gear unit as the device to be driven.

Figure 2:
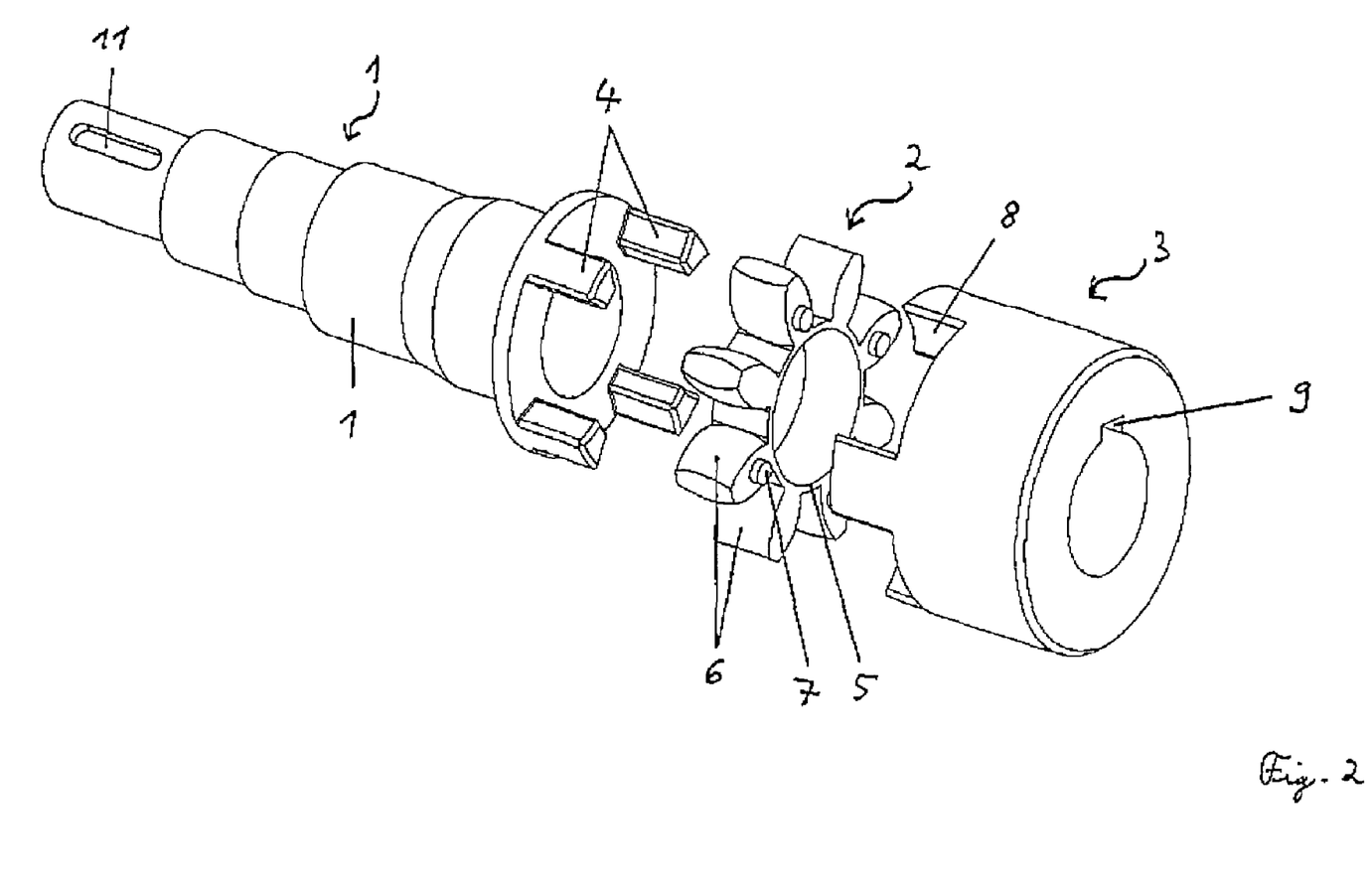
FIG. 2 is an exploded view of the adapter device according to the present invention.

FIG. 2 shows an exploded drawing of the adapter device according to the present invention.

At its first end, adapter shaft 1 again has a feather keyway 11 for the connection to a pinion of a gear unit. In addition, integrated at its second end are claws 4 which have curved flanks in the radial direction. Intermediate piece 2 features base member 5, radial section 6 and spacer 7. It is arranged with its radial sections 6 between the claws of adapter shaft 1 and claws 8 of coupling part 3, which includes a feather keyway 9 for receiving feather key 13.

The flanks of claws 4, 8 are curved and the radial sections have a convex design such that, under load, particularly rated load or overload, the flexible material of radial sections 6 of intermediate piece 2 is not pressed radially to the outside, but rather radially to the inside toward the axis. Consequently, radial sections 6 then exert a force or a pressure in the radial direction on base member 5. The wear and tear of the intermediate piece is reduced in this manner. Spacers 7 keep adapter shaft 1 and coupling part 3 apart.

Radial sections 6 have a convex shape in the axial, radial and circumferential direction in order, in interaction with the convex shape of the flanks of claws 4, 8 in the radial direction and in the circumferential direction, to exert the indicated radially directed force on the base member.

After intermediate piece 2 has worn, for example, in an emergency case, the coupling is not allowed to spin, since claws 4, 8 may guarantee safety against breakdown.

Figure 3:
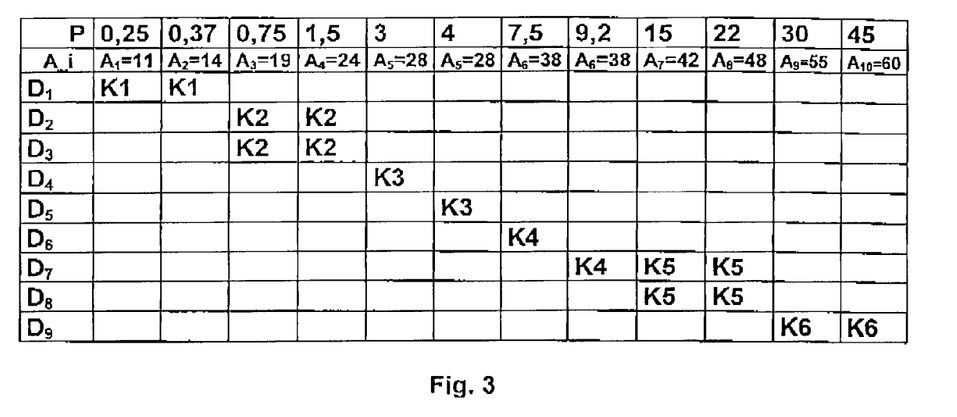
FIG. 3 illustrates an example embodiment of the present invention for an IEC grading.

FIG. 3 illustrates an exemplary embodiment according to the invention for an IEC grading. Motor power P of the production series is entered in the first line. Below it are the appertaining diameters $A\_i$ of the bore holes of coupling part 3 from the IEC-Standard grading, which are assigned to the outside diameters of the motor journals. In this context, index i is from 1 to 10.

Entered in the left column are the diameters $D\_i$ of the pinion journals, thus the diameters $D\_i$ of adapter shaft 1 for connection to a pinion in the region of feather keyway 11 of adapter shaft 1. They belong to the manufacturer's own grading of the gear unit manufacturer. In this context, index i is from 1 to 9. With rising index, the value of diameter $D\_i$ increases. Each value $D\_i$ is less than the corresponding value $A\_i$ having the same index i. Thus, $D_1<A_1$, $D_2<A_2$, and so forth, is always applicable. Diameters $D\_i$ and the power to be transmitted in each case are therefore adjusted so that a possibly slightly oversized standardized motor grading of diameters $A\_i$ is usable, and at the same time, the adapter device is designed as optimally, particularly as small, as possible.

Intermediate pieces K1, K2, K3, K4, K5, K6 for the respective motor journals and pinion journals are entered in the matrix. They are rated so that under load, radial sections 6 are subjected to an approximately equal compressive load per unit area, at the greatest power to be transmitted. The value of the compressive load per unit area is in a tolerance range around 2.7 N/mm^2, and includes essentially values from 2.6 to 2.8 N/mm^2. At small or large powers, values such as 3.2 or 2.3 N/mm^2 may also occur. Therefore, essentially a special polyurethane is usable, which may be utilized very well or to the maximum.

Intermediate pieces K2 and K5 fill in 2*2 sub-matrices. This means that in the production series, these intermediate pieces are usable for various diameters $A\_i$ and $D\_i$, and therefore not only the standard production series of the manufacturer may be offered, but also special constructions within the production series according to the present invention are possible, without additional expenditure of time and energy or additional costs. Thus, the intermediate pieces are usable repeatedly within the production series.

Figure 4:
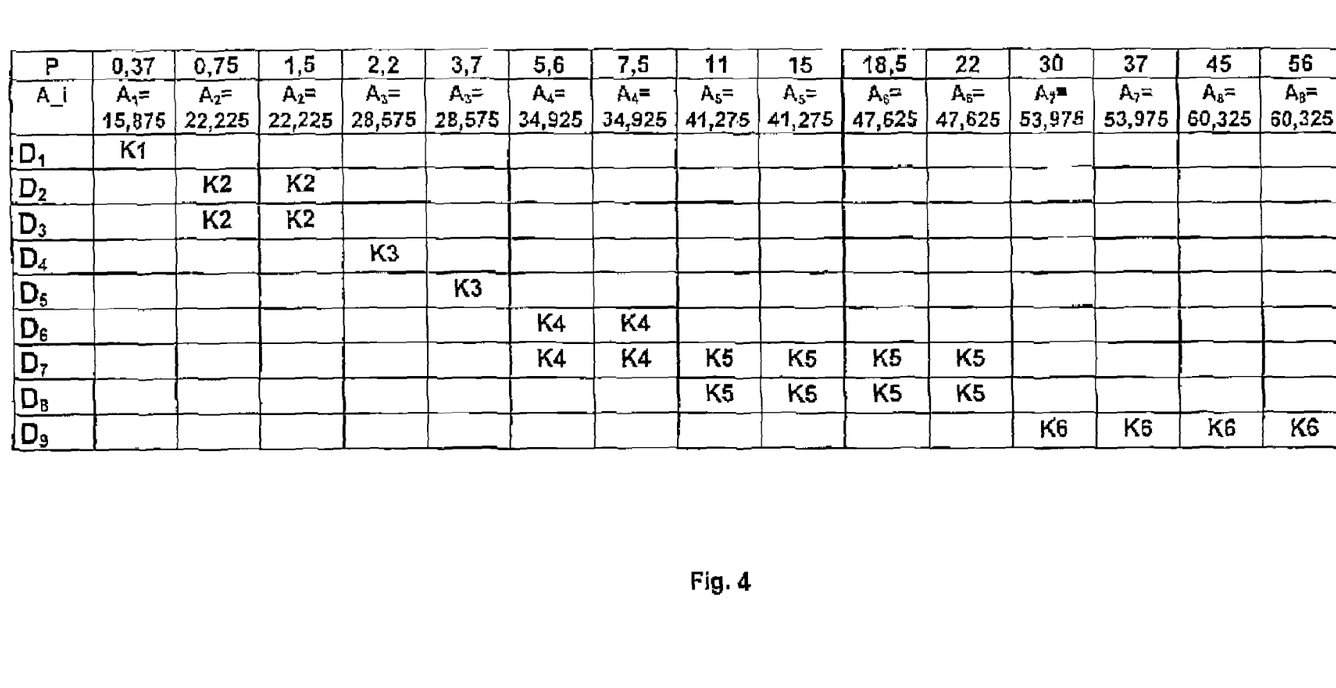
FIG. 4 illustrates an example embodiment of the present invention for a NEMA grading.

FIG. 4 illustrates an exemplary embodiment of the present invention for a NEMA grading of diameters $A\_i$ which are again indicated in mm. The production series according to FIG. 4 likewise shows multiple usage, with the features indicated.

The same intermediate pieces K1 through K6 may be usable for the production series according to FIG. 4 with NEMA grading and for the production series according to FIG. 3 with IEC grading of diameters $A\_i$.

FIG. 5 again illustrates the exemplary embodiment of the present invention according to FIG. 2, including the components adapter shaft 1, intermediate piece 2 and coupling part 3. However, coupling part 3 is pushed to one side. In addition, a driver part 51 and another coupling part 53 are illustrated. Driver part 51 has claws 58 which are equal to claws 8 of coupling part 3, and it may be joined to the other coupling part 53 by screws 52. Driver part 51 and the other coupling part 53 together form a coupling.

In different exemplary embodiments of the present invention, the coupling is designed according to various acting principles. The coupling may be designed according to the type of so-called overload coupling.

In this manner, intermediate piece 2 is just as protected as claws 4 of the adapter shaft and claws 8 of coupling part 3. The input and output devices are also protected. The transmission characteristic of an overload coupling may be such that, when the load is unacceptably high, the transmission characteristic no longer corresponds to the transmission characteristic at rated load, and therefore the input and output devices are protected. Such overload couplings are generally conventional and have widely varying designs. They may be classified according to their acting principles. They are of the automatic switching type, or the non-automatic switching type. Moreover, the overload couplings may be classified according to load-disconnecting or load-retaining transmission characteristic. Further classification features are frictionally-engaged, form-locking or continuous-material characteristics.

Figure 6:
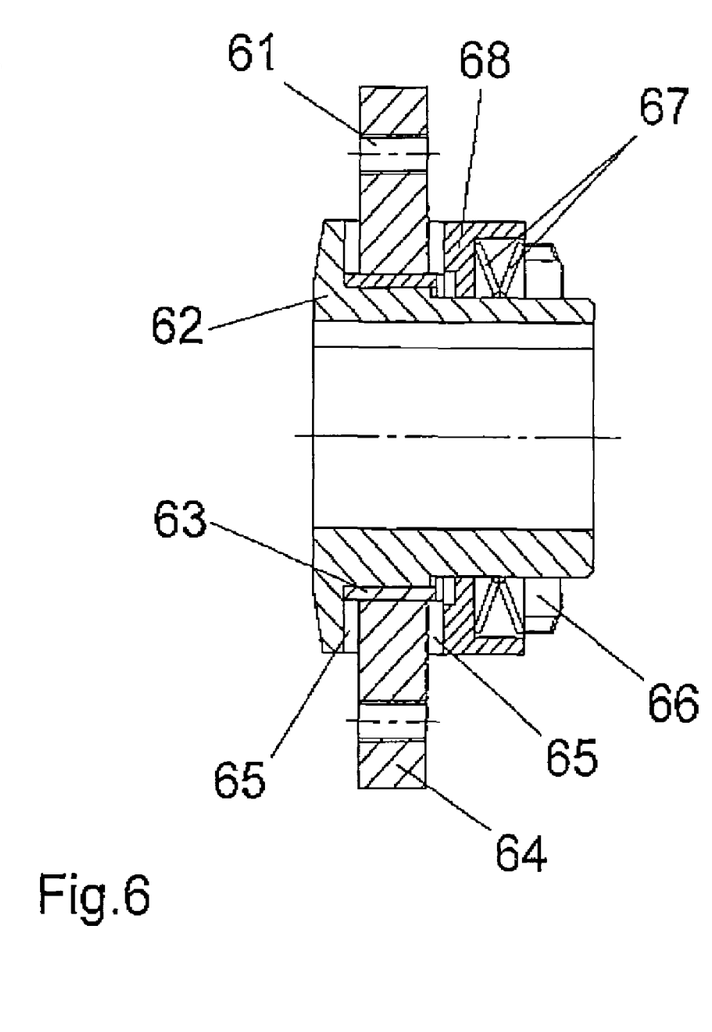
FIG. 6 is a cross-sectional view of a friction coupling.
Figure 7:
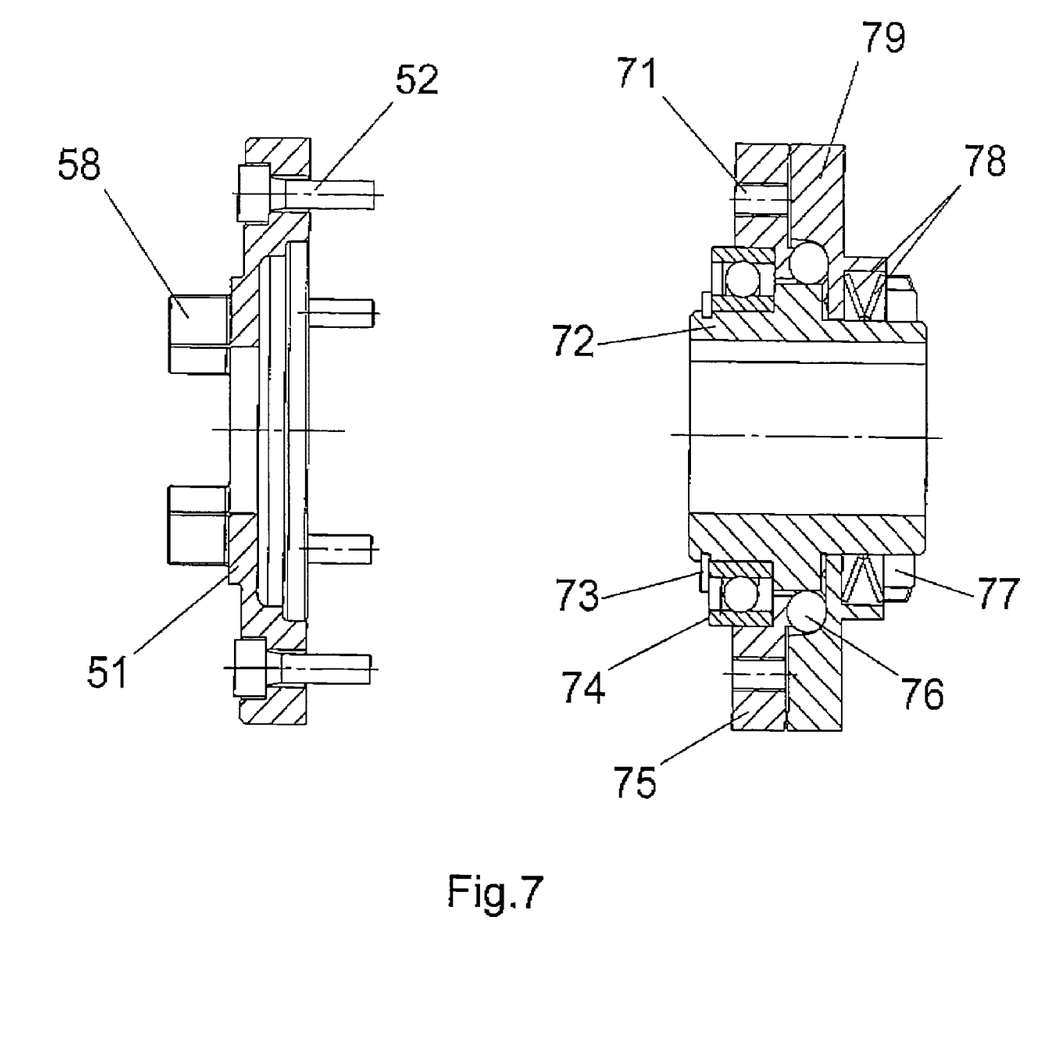
FIG. 7 is a cross-sectional view of a release coupling.

According to FIGS. 6 and 7, a release coupling and a friction coupling are illustrated schematically as exemplary embodiments of the present invention. However, in furtherance of the inventive principle for one skilled in the art, particularly of the integration of claws into the driver part of a coupling, which, except for the requirement of the inclusion of at least one driver part, is as desired, various further couplings may be used.

A friction coupling is illustrated schematically in FIG. 6. The shaft on the input side, particularly one driven by an electric motor, is connected to coupling hub 62 by a feather key connection. Disposed about guide bush 63 is brake disk 64 which has tapped holes 61 and, with the aid of screws 52 that may be detachably connected to these tapped holes 61, is connectable to driver part 51 including claws 58.

With the assistance of claws 58, the friction coupling is engaged with intermediate piece 2 in a corresponding manner as coupling part 3 with its claws.

Slotted nut 66 is screwed onto coupling hub 62 and exerts force on thrust ring 68 via disk springs 67. Therefore, thrust ring 68 causes brake liners 65 to press against brake disk 64. Brake disk 64 slips only when a critical value for the transmitted torque is exceeded. Consequently, the input and output devices and the adapter device itself are protected.

FIG. 6 only illustrates the acting principle of the friction coupling schematically. One skilled in the art is in the position to add further components to refine the friction coupling.

A release coupling is illustrated schematically in FIG. 7. The shaft on the input side, particularly one driven by an electric motor, is connected to coupling hub 72 by a feather key connection. Disposed about coupling hub 72 by a bearing 74 is collar ring 75, in which balls 76 are located as long as no critical value of torque is yet transmitted. In this context, thrust ring 79 is pressed onto balls 76 by disk springs 78 which are braced against slotted nut 77. Retaining ring 73 represents an axial limitation for bearing 74.

Driver part 51 including claws 58 is connectable by screws 52 which may be detachably connected to tapped holes 71 of collar ring 75.

With the assistance of claws 58, the release coupling is engaged with intermediate piece 2 in a corresponding manner as coupling part 3 with its claws.

FIG. 7 only illustrates the acting principle of the release coupling schematically. Therefore, one skilled in the art is in the position to add further components to refine the release coupling.

Figure 5:
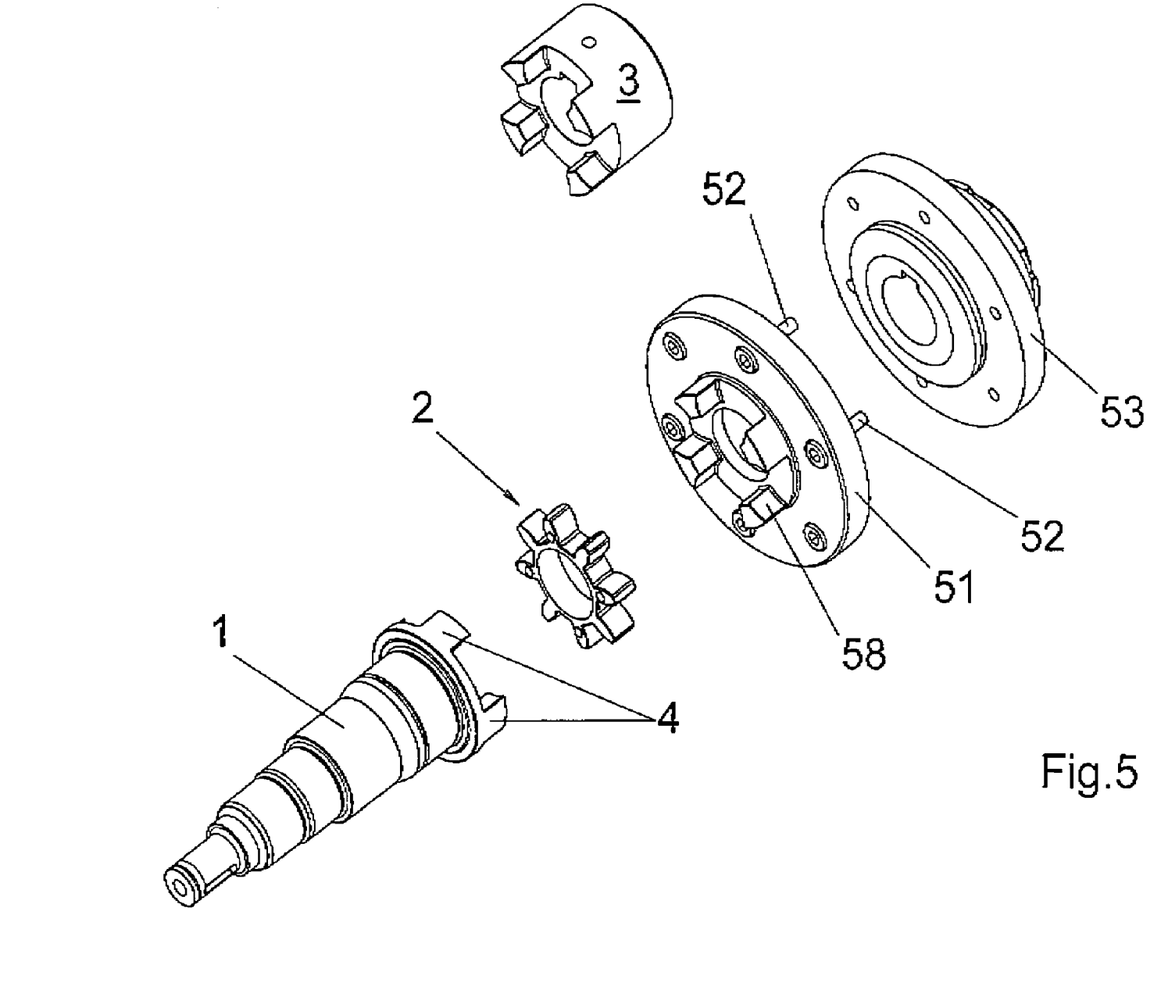
FIG. 5 is an exploded view of an example embodiment of the present invention.

Thus, in FIG. 5, the production series of adapter devices already described is expanded in its variety so that, on the input side, it is possible to build onto coupling part 3 by various driver parts 51 together with other coupling parts 53, depending on the request of the customer or other requirement. The claws which are engaged with intermediate piece 2 are equal to the claws of coupling part 3 and in the case of driver part 51 are integrated, in particular are worked out from one work piece in one processing operation.

Thus, when no feather key is desired on the input side, an overload coupling of a selectable acting principle may be provided.

In further exemplary embodiments of the present invention, with respect to the overload coupling, a sensor is mounted which detects an event in the case of an overload. With respect to the release coupling, for example, an inductive sensor may be provided for this purpose which detects the relative distance of spherical calotte 75 and thrust ring 79. Instead of inductive sensors, other sensors may also be used which are able to detect correspondingly linear distances.

With respect to the friction coupling, sensors may be provided which detect the relative movement of the brake disk against brake liners 65, coupling hub 62 or slotted nut 66.

For the release coupling, it is also possible to monitor an electrical contact between thrust ring 79 and collar ring 75.

In the instances indicated, the sensor or the monitoring of the electrical contact supplies information about the overload case. This information is passed on, made audible acoustically or indicated visually.

In particular, in the event of overload, it is even possible to switch off the entire drive or to reduce the torque produced by the electric motor torque.

What is claimed is:

1. A production series of adapter devices, the production series including at least one size, each size including at least one variant, each adapter device including:
    an adapter shaft configured to connect to a device to be driven;
    an intermediate piece engaged with the adapter shaft; and
    a sub-component engaged with the intermediate piece and configured to connect to an input shaft;
    wherein each variant includes:
        a diameter $A_i$ of a bore hole arranged to accommodate the input shaft in the sub-component;
        the intermediate piece; and
        a diameter $D_i$ at an end of the adapter shaft facing away from the intermediate piece;
    wherein i represents a numbering index;
    wherein the diameters $A_i$ of the bore holes are included in a standardized motor grading;
    wherein with increasing characteristic power, the diameters $D_i$ at least do not become smaller;
    wherein each intermediate piece includes radial sections arranged so that at a greatest power provided for at least one of the intermediate piece and the characteristic power, the radial sections are subjected to a value of compressive load per unit area within a single tolerance range in accordance with an entire production series;
    wherein at least one of:
        at least one intermediate piece is used in variants of at least two different sizes; and
        at least one intermediate piece is used for sub-components having different diameters $A_i$ of the bore hole to accommodate the input shaft and for adapter shafts having different diameters $D_i$ in a region of a feather keyway of the adapter shaft;
    wherein the sub-component includes a bore hole configured to accommodate the input shaft and is connectable to the input shaft by a feather key connection.

2. The production series according to claim 1, wherein for each variant, the characteristic power corresponds to one of a nominal power, a power to be transmitted in each instance and a maximum transmittable power.

3. The production series according to claim 1, wherein the sub-components are configured to have different functionality for different variants of the production series.

4. The production series according to claim 3, wherein the sub-component is configured to form-lockingly connect to the input shaft and to engage with the intermediate piece and is configured as one of a rigid coupling part and an overload coupling.

5. The production series according to claim 1, wherein the diameters $D_i$ are always smaller than the diameters $A_i$ for the same index i.

6. The production series according to claim 1, wherein the tolerance range includes values between 2 N/mm$^2$ and 3.2 N/mm$^2$.

7. The production series according to claim 1, wherein the tolerance range includes values between 2.6 N/mm$^2$ and 2.8 N/mm$^2$.

8. The production series according to claim 1, wherein the standardized motor grading of the diameters $A_i$ includes at least one of an IEC standardized motor grading and a NEMA standardized motor grading.

9. The production series according to claim 1, wherein the production series is included in a larger production series so that the production series includes gaps.

10. The production series according to claim 9, wherein the larger production series includes a production series having an IEC standardized motor grading of diameters $A_i$ and a production series having a NEMA standardized motor grading of diameters $A_i$, at least one of the intermediate pieces of the production series having the IEC standardized motor grading of the diameters $A_i$ included in the production series having the NEMA standardized motor grading of the diameters $A_i$.

11. The production series according to claim 4, wherein the sub-component is configured to form-lockingly connect to the input shaft in accordance with a feather key connection.

12. The production series according to claim 1, wherein the input shaft includes a motor shaft.

* * * * *